(12) United States Patent
Bronstein et al.

(10) Patent No.: US 9,794,545 B2
(45) Date of Patent: Oct. 17, 2017

(54) SINGLE VIEW FEATURE-LESS DEPTH AND TEXTURE CALIBRATION

(71) Applicant: Intel Corporation, Santa Clara, CA (US)

(72) Inventors: Alex Bronstein, Haifa (IL); Aviad Zabatani, Even Yehuda (IL); Ron Kimmel, Haifa (IL); Michael Bronstein, Lugano (CH); Erez Sperling, D. N. Menashe (IL); Vitaly Surazhsky, Yokneam Illit (IL)

(73) Assignee: INTEL CORPORATION, Santa Clara, CA (US)

( * ) Notice: Subject to any disclaimer, the term of this patent is extended or adjusted under 35 U.S.C. 154(b) by 196 days.

(21) Appl. No.: 14/865,211

(22) Filed: Sep. 25, 2015

(65) Prior Publication Data
US 2017/0094256 A1 Mar. 30, 2017

(51) Int. Cl.
*H04N 13/02* (2006.01)
*G06T 7/00* (2017.01)
*H04N 13/00* (2006.01)

(52) U.S. Cl.
CPC ....... *H04N 13/0246* (2013.01); *G06T 7/0057* (2013.01); *H04N 13/0011* (2013.01); *H04N 13/025* (2013.01); *H04N 13/0253* (2013.01)

(58) Field of Classification Search
CPC ........... H04N 13/0246; H04N 13/0253; H04N 13/025; H04N 2013/0081
See application file for complete search history.

(56) References Cited

U.S. PATENT DOCUMENTS

2015/0002628 A1\* 1/2015 Reif ...................... G06T 7/0044
348/46

\* cited by examiner

*Primary Examiner* — Nam Pham
(74) *Attorney, Agent, or Firm* — Blakely Sokoloff Taylor and Zafman LLP

(57) ABSTRACT

A method and apparatus for performing a single view depth and texture calibration are described. In one embodiment, the apparatus comprises a calibration unit operable to perform a single view calibration process using a captured single view a target having a plurality of plane geometries having detectable features and being at a single orientation and to generate calibration parameters to calibrate one or more of the projector and multiple cameras using the single view of the target.

24 Claims, 11 Drawing Sheets

% Range
s1 = (2^PrecisionBits) / Rmax        % Range scaling
s2 = 2^CodeBits                      % Projector coordinate scaling alpha = 2/Width/Kc(1,1)              % Camera coordinates scaling
beta = -(Kc(1,3)+1) / Kc(1,1)
gamma = 2/Height/Kc)2,2)
delta = -(Kc(2,3)+1 / Kc(2,2)

a = alpha/gamma
b = beta/gamma
c = delta/gamma d1 = distc(1) * gamma^2
d2 = distc(2) * gamma^4 p1 = Pp(2,4) * s1
p2 = -s1*s2 * (Pp(1,4)+Pp(2,4))
p3 = -Pp (2,1)
p4 = -Pp (2,2)
p5 = -Pp (2,3) / gamma
p6 = s2 * (Pp(1,1) + Pp(2,1))
p7 = s2 * (Pp(1,2) + Pp(2,2))
p8 = s2 * (Pp(1,3) + Pp(2,3)) / gamma q = 1 / gamma^2

% Texture
suv = 2^TexturePrecisionBits h0 = (Pt(1,2) + Pt(3,2)) / (Pt(1,1) + Pt(3,1))
h1 = (Pt(1,3) + Pt(3,3)) / (Pt(1,1) + Pt(3,1)) / gamma
h2 = (Pt(2,1) + Pt(3,1)) / (Pt(1,1) + Pt(3,1))
h3 = (Pt(2,2) + Pt(3,2)) / (Pt(1,1) + Pt(3,1))
h4 = (Pt(2,3) + Pt(3,3)) / (Pt(1,1) + Pt(3,1)) / gamma
h5 = 2 * Pt(3,1) / (Pt(1,1) + Pt(3,1)) / suv
h6 = 2 * Pt(3,2) / (Pt(1,1) + Pt(3,1)) / suv
h7 = 2 * Pt(3,3) / (Pt(1,1) + Pt(3,1)) / suv / gamma
h8 = (Pt(1,4) + (Pt(3,4)) / (Pt(1,1)) + Pt(3,1)) * s1
h9 = (Pt(2,4) + (Pt(3,4)) / (Pt(1,1)) + Pt(3,1)) * s1
h10 = 2 * Pt(3,4) / (Pt(1,1) + Pt(3,1)) * s1 / suv

FIG. 7

```
% Inverse camera model
x = a*xcam + b
y = ycam + c
r2 = x^2 + y^2
r2c = 1 + d1*r2 + d2*r2^2 + d5*r2^3
xc = x*r2c + 2*d3*x*y + d4*(r2 + 2*x^2)
yc = y*r2c + 2*d4*x*y + d3*(r2 + 2*y^2)
nrm = sqrt (xc^2 + yc^2 + q)

% R coefficients
TriangCoef1 = p1*nrm
TriangCoef2 = p2*nrm
TriangCoef3 = p3*xc + p4*yc + p5
TriangCoef4 = p6*xc + p7*yc + p8

% UV coefficients
TextureCoef1 = xc + h0*yc + h1
TextureCoef2 = h2*xc + h3*yc + h4
TextureCoef3 = h5*xc + h6*yc + h7
TextureCoef4 = h8*nrm
TextureCoef5 = h9*nrm
TextureCoef6 = h10*nrm % Range reconstruction
r = (TriangCoef1*xp + TriangCoef2) /
    (TriangCoef3*xp + TriangCoef4)

% Texture map reconstruction
den = TextureCoef3 * r + TextureCoef6
u = (TextureCoef1 * r + TextureCoef4) / den
v = (TextureCoef2 * r + TextureCoef5) / den
```

FIG. 8

SINGLE VIEW FEATURE-LESS DEPTH AND TEXTURE CALIBRATION

FIELD OF THE INVENTION

Embodiments of the present invention relate to the field of camera systems that perform three-dimensional (3-D) measurements by use of triangulation capturing one or more images with the assistance of one or more patterns projected by a projector; more particularly, embodiments of the present invention relate to performing depth and texture calibration of such camera systems.

BACKGROUND

Stereo depth cameras are well-known and are often used to measure a distance from an object. One such measurement device includes a projector and a camera. In such a device, the projector projects a known pattern image on an object (e.g., a scene), and am image of the object upon which the image is projected is captured by the camera. From the captured images, depth information may be determined. One technique for determining depth in such devices is through the use of triangulation. Thus, images of objects are captured and measurements are taken to determine depth information.

There is need to calibrate the intrinsic and extrinsic geometric parameters of an active coded light passive triangulation system including the infrared (IR) projector, the IR camera, and the red, green, and blue (RGB) camera. Typically, the process is performed on a per-unit basis during the assembly. Such calibration is usually handled using a "multi-view" approach that includes presenting to the camera a planar target with detectable features, such as a checkerboard, and capturing data at a set of unknown orientations. This approach has several major disadvantages. First, the need to automatically capture several views of the target increases the acquisition time and requires complicated mechanics. Second, the feature detection quality may be greatly compromised by the low modulation transfer function (MTF) of the IR camera, affecting the quality of the entire process. For example, the IR camera may not be able to accurately detect the landmark points in the target object.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7 illustrates an example of coefficient precomputation parameters.

FIG. 8 illustrates an example of range and texture reconstruction and coefficient precomputation.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
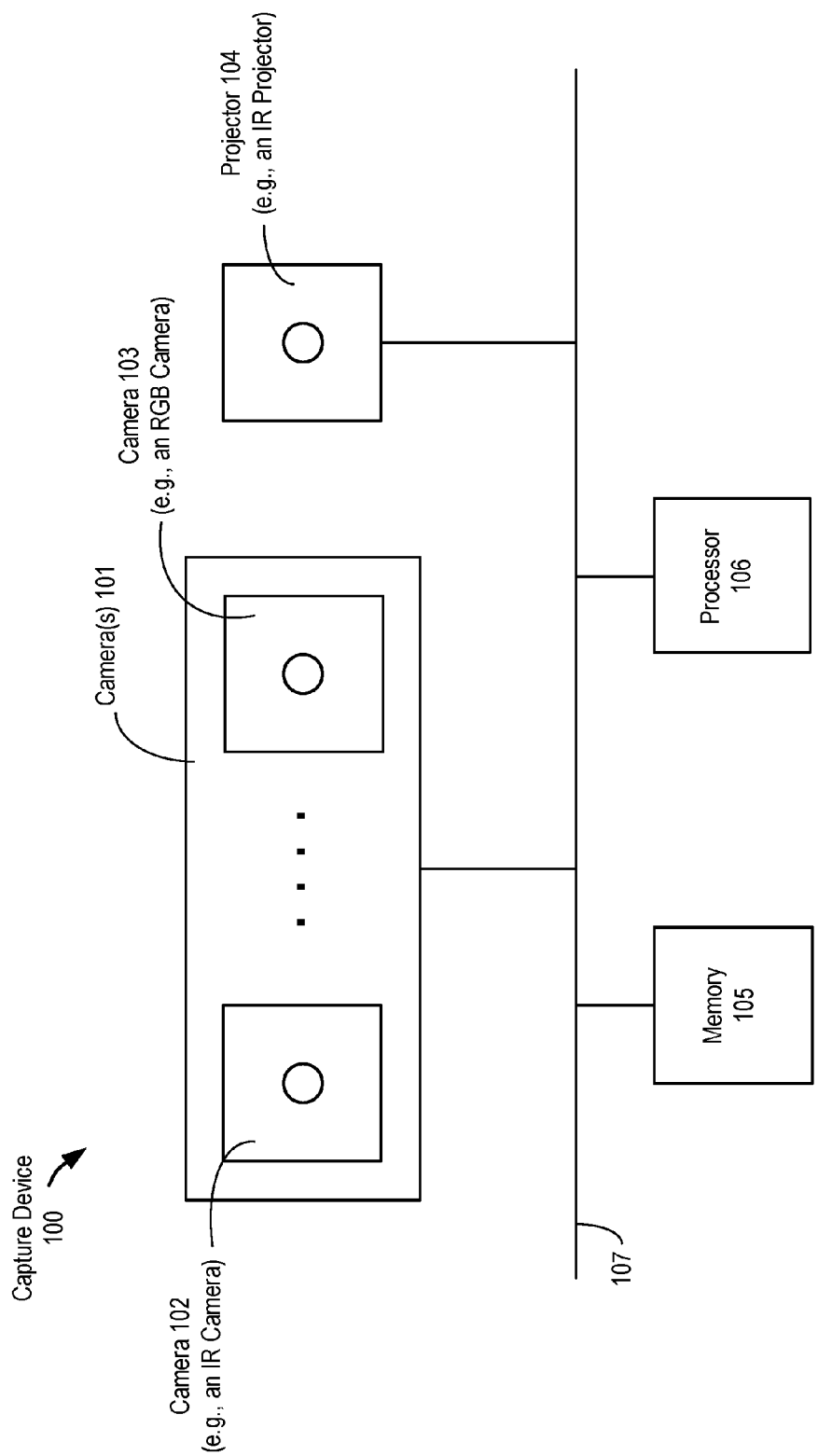
FIG. 1 illustrates one embodiment of an active coded light triangulation system.

FIG. 1 illustrates one embodiment of an active coded light triangulation system. The system includes coded light range cameras operating by projecting a sequence of one-dimensional binary ("black" and "white") patterns onto a scene, such that the produced binary code encodes the angle of the projection plane. Depth is then reconstructed by triangulation consisting of computing the intersection of an imaginary ray emanating from the camera with the plane emanating from the projector.

Referring to FIG. 1, capture device 100 may include a 3D scanner, a 3D camera or any other device configured for a 3D object acquisition. In some embodiments, as illustrated, capture device 100 includes an image capturing device 102 (e.g., a digital camera) and a projector unit 104, such as a laser projector or laser scanner, having a number of components. In some embodiments, digital camera 102 may comprise an infrared (IR) camera, and the projector unit 104 may comprise an IR projector.

Projector unit 104 is configured to project a light pattern as described above and may comprise a one-dimensional code projector. In one embodiment, the light patterns comprise one-dimensional coded light patterns, e.g., the patterns that may be described by one-dimensional or linear codes. The light patterns formed by the laser planes on a surface of the object may be received by image capturing device 102 and sensed (e.g., read) by a sensor of image capturing device 102. Based on the readings of the multiple scans of the light patterns accumulated during a sensing cycle of the sensor, capture device 100 may be configured to reconstruct the shape of the object.

In some embodiments, capture device 100 may further include another image capturing device, such as digital camera 103. In some embodiments, digital camera 103 may have a resolution that is different than that of digital camera 103. For example, digital camera 102 may be a multi-chromatic camera, such as red, green, and blue (RGB) camera configured to capture texture images of an object.

Capture device 100 may further include a processor 106 that may be in operative communication with the image camera component 101 over a bus or interconnect 107. Processor 106 may include a standardized processor, a specialized processor, a microprocessor, or the like that may execute instructions that may include instructions for generating depth information, generating a depth image, determining whether a suitable target may be included in the depth image, or performing other operations described herein.

Processor 106 may be configured to reconstruct the object based on the images captured by digital camera 102, for example, using geometry techniques or other techniques used for 3D image reconstruction. Processor 106 may be further configured to dynamically calibrate capture device 100 to correct distortions in the reconstructed image of the object that may be caused, for example, by various external factors (e.g., temperature).

Capture device 100 may further include a memory 105 that may store the instructions that may be executed by processor 106, images or frames of images captured by the cameras, user profiles or any other suitable information, images, or the like. According to one example, memory 105 may include random access memory (RAM), read only memory (ROM), cache, Flash memory, a hard disk, or any other suitable storage component. As shown in FIG. 1, memory component 105 may be a separate component in communication with the cameras 101 and processor 106. Alternatively, memory 105 may be integrated into processor 106 and/or the image capture cameras 101. In one embodiment, some or all of the components 102-106 are located in a single housing.

Processor 105, memory 104, other components (not shown), image capturing device 102, and projector unit 104 may be coupled with one or more interfaces (not shown) configured to facilitate information exchange among the above-mentioned components. Communications interface(s) (not shown) may provide an interface for device 100 to communicate over one or more wired or wireless network(s) and/or with any other suitable device. In various embodiments, capture device 100 may be included to or associated with, but is not limited to, a server, a workstation, a desktop computing device, or a mobile computing device (e.g., a laptop computing device, a handheld computing device, a handset, a tablet, a smartphone, a netbook, ultrabook, etc.).

In one embodiment, capture device 100 is integrated into a computer system (e.g., laptop, personal computer (PC), etc.). However, capture device 100 can be alternatively configured as a standalone device that is couplable to such a computer system using conventional technologies including both wired and wireless connections.

In various embodiments, capture device 100 may have more or less components, and/or different architectures. For example, in some embodiments, capture device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, capture device 100 may have more or less components, and/or different architectures. In various embodiments, techniques and configurations described herein may be used in a variety of systems that benefit from the principles described herein.

Capture device 100 may be used for a variety of purposes, including, but not limited to, being part of a target recognition, analysis, and tracking system to recognize human and non-human targets in a capture area of the physical space without the use of special sensing devices attached to the subjects, uniquely identify them, and track them in three-dimensional space. Capture device 100 may be configured to capture video with depth information including a depth image that may include depth values via any suitable technique including, for example, triangulation, time-of-flight, structured light, stereo image, or the like.

Capture device 100 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, capture device 100 includes an IR light projector 404, an IR camera 102, and a visible light RGB camera 103 that are configured in an array.

Various techniques may be utilized to capture depth video frames. For example, capture device 100 may use structured light to capture depth information. In such an analysis, patterned light (i.e., light displayed as a known pattern such as a grid pattern or a stripe pattern) may be projected onto the capture area via, for example, IR light projector 104. Upon striking the surface of one or more targets or objects in the capture area, the pattern may become deformed in response. Such a deformation of the pattern may be captured by, for example, he IR camera 102 and/or the RGB camera 103 and may then be analyzed to determine a physical distance from capture device 100 to a particular location on the targets or objects.

Capture device 100 may utilize two or more physically separated cameras that may view a capture area from different angles, to obtain visual stereo data that may be resolved to generate depth information. Other types of depth image arrangements using single or multiple cameras can also be used to create a depth image.

Capture device 100 may provide the depth information and images captured by, for example, IR camera 102 and/or the RGB camera 103, including a skeletal model and/or facial tracking model that may be generated by capture device 100, where the skeletal and/or facial tracking models, depth information, and captured images are used to, for example, create a virtual screen, adapt the user interface, and control an application.

In summary, capture device 100 may comprise a projector unit 104, a digital camera (e.g., IR camera) 102, another digital camera (e.g., multi-chromatic camera) 103, and a processor (controller) configured to operate capture device 100 according to the embodiments described herein. However, the above assembly configuration is described for illustration purposes only, and is should not be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and the third camera (e.g. with a resolution that is different than those of the two cameras) may be used to capture images of the object in order to identify image distortions in the reconstructed object and to compensate for identified distortions.

Depth and Texture Calibration

Techniques described herein are directed to the depth and texture calibration of a capture device (e.g., a stereo depth camera). In one embodiment, the depth and texture calibration is a single view calibration using a target that includes a known geometry, without moving parts and without relying on feature detection. In one embodiment, the geometry is sufficiently simple that its intersection with a ray (and derivatives thereof) can be efficiently computed. In one embodiment, the geometry is a known geometry with known radiometric properties (e.g., a geometry having multiple plane geometries). In other words, instead of capturing multiple different views of a target of a single plane geometry, one embodiment of the calibration process described herein captures a target with a plurality of different plane geometries (e.g., seven plane geometries, any other number of plane geometries). Such a calibration process enables calibration with increased accuracy even for low quality sensors and optics, while using a single view calibration process, which enables to reduce calibration time and complexity. Thus, techniques described herein include a single-view feature-less depth and texture calibration using a target with known geometry.

In one embodiment, the calibration is performed to calibrate either or both intrinsic and extrinsic parameters. In one embodiment, the intrinsic parameters include one or more of lens parameters of an IR camera, an IR projector, and/or an RGB camera. In one embodiment, the extrinsic parameters include the Euclidean transformation of relative positioning and orientation of system devices relative to the IR camera.

In one embodiment, calibration parameters are used by an image processing unit to generate depth values. In one embodiment, the image processing unit receives a sequence of images and reconstructs depth using triangulation in response to camera and projector location coordinates. In one embodiment, when the image data from the stereo depth camera is processed to produce depth information (e.g., depth values), a triangulation process issued. More specifically, as discussed above, a coded light camera comprising an IR projector 104 projects one-dimensional code patterns onto the scene, and an IR camera 102 captures the patterns. Decoding of the captured patterns at every pixel location $x_c$ in the camera produces a code encoding the location $x_p$ of the projected plane. In triangulation, the plane is intersected with the ray emanating from the camera focal point through $x_c$, yielding the distance to the object $z(x_c)$.

Figure 2:
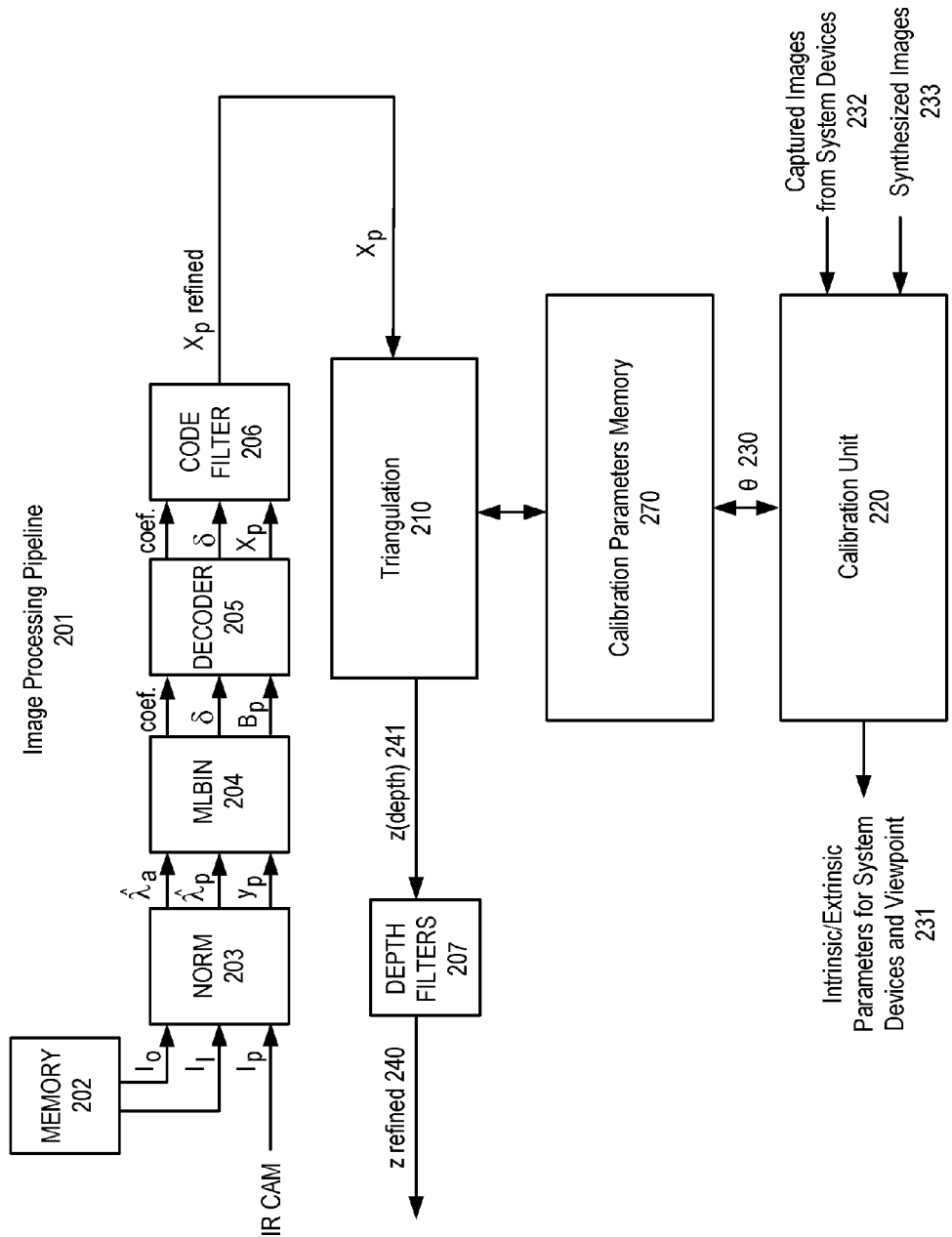
FIG. 2 is a block diagram depicting one embodiment of a processing pipeline with a calibration unit for a stereo depth camera.

FIG. 2 is a block diagram depicting one embodiment of an image processing pipeline for a stereo depth camera. The stereo depth camera comprise a projector configured to project a sequence of light patterns on an object and a first camera configured to capture a sequence of images of the object illuminated with the projected light patterns.

Referring to FIG. 2, a flow of processing the input from the IR camera to determine depth values is described. In the process, depth values are determined using a triangulation reconstruction process. In one embodiment, the reconstruction process comprises several operations of successive linearization of the distorted projector surface, and the computation of array-plane intersection from which the point in the world coordinates is triangulated. The triangulation-based reconstruction process is configured to take into account the projector distortion.

Image processing pipeline 301 receives a sequence of images and determines depth information in response to parameters of the projector (e.g., projector 104) and camera (e.g., camera 102). Image processing pipeline 301 is performed by processing logic that may comprise hardware (circuitry, dedicated logic, etc.), software (such as is run on a general purpose computer system or a dedicated machine), firmware, or a combination of these three. Note that in one embodiment, image processing pipeline 201 of FIG. 2 is part of the capture device (e.g., the capture device of FIG. 1). In another embodiment, the image processing pipeline of FIG. 2 is not part of the capture device and performs triangulation in a separate device.

Image processing pipeline 201 includes a memory 202 that stores sequences of patterns. The IR camera captures images and provides captured sequences of patterns $I_p$ to normalization unit 203. The sequences of patterns are normalized via normalization unit 203, which provides the normalized pattern sequences to binarizer 204. Binarizer 204 generates binarization codes based on the normalized sequences of patterns and provides the binarization codes to decoder 205. Decoder 205 decodes each of the binarization codes to create a decoded value $x_p$ of a pixel location of the pixel on a projector plane. Code filter 206 performs filtering to remove and/or correct those values that are not possible. The output of code filter 206 is the value of $x_p$ corresponding to a pixel, which is received as an input at the triangulation-based reconstructions module. The image processing performed by normalization unit 203, binarizer 204, decoder 205 and code filter 206 is well-known in the art.

Image processing pipeline 201 includes a triangulation processing unit 210. Triangulation processing unit 210 receives $x_p$ and $x_c$, which are well-known in the triangulation process and calibration parameters and, in response thereto, generates depth values, z 241, by use of triangulation. The depth values undergo filtering with depth filters 207 to generate refined depth values 240 in a manner well-known in the art.

Some calibration parameters and a viewpoint are generated by calibration unit 220 and calibration parameters are provided to triangulation processing unit 210. Calibration unit 220 generates the calibration parameters and viewpoint in response to captured images 232 that were captured by system devices, such as the IR and RGB cameras, and synthesized images 233 generated by the system (e.g., a processor executing instructions in the system). Note that this capturing is not part of the normal capture operation of the capture device when the capture device is being used for its intended purpose.

Figure 10:
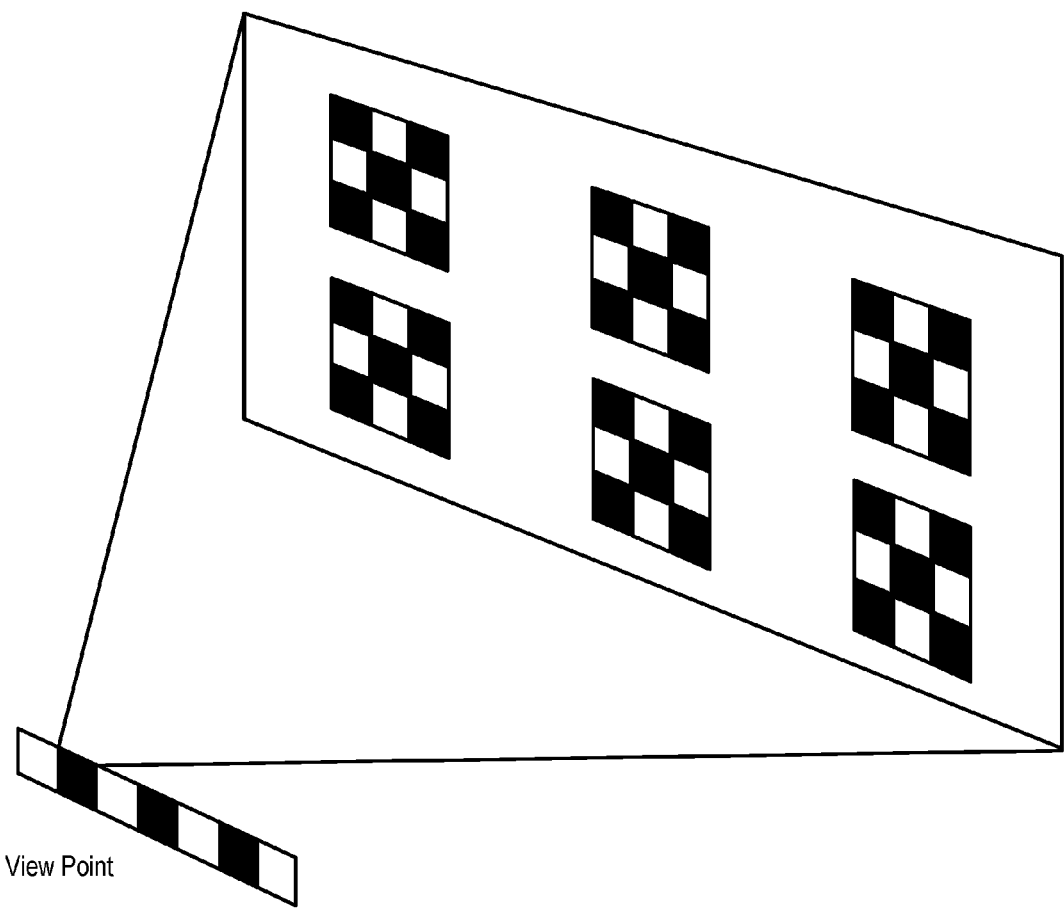
FIG. 10 illustrates a target image having serve geometry planes.

In one embodiment, the system devices, such as a camera, captures a single view of a target at a single orientation. One or more captures may be performed by different cameras in the system. The target has a known geometry with known radiometric properties (e.g., a geometry having multiple plane geometries (e.g., two, four, five or six identical plane geometries with a background plane geometry). In one embodiment, the geometry (e.g., each of the plane geometries) has a sufficient amount of texture to make the image sensitive to small perturbations of the calibration parameters. In practice, this means lots of strong edges and corners. That is, the target has a known and accurate geometry. In one embodiment, the target is planar and the multiple plane geometries comprises seven plane geometries. In one embodiment, one or more of the plane geometries comprises an identical pattern. FIG. 10 illustrates an example of a target with six identical plane geometries with a common pattern (e.g., checkerboard) and a background geometry. In one embodiment, the patterns are high contrast patterns in a manner well-known in the art.

These captured images of the single target are provided to calibration unit 220 that performs a single view calibration process using the captured single view to generate calibration parameters to calibrate one or more devices in an active coded light triangulation system using the single view of the target. In one embodiment, the single view calibration process comprises a rough calibration process, a depth refinement process and an RGB camera calibration process.

Calibration unit 220 also uses one or more captured images to generate the viewpoint of the system.

In one embodiment, one or more calibration parameters are set based on alignment of a captured image to a corresponding synthesized image. In one embodiment, the intrinsic and extrinsic calibration parameters updated and the viewpoint generated based on closeness of a match between the captured image and the corresponding synthesized image. In one embodiment, the calibration parameters comprise intrinsic parameters that relate to one or more of lens parameters of one or more of the devices. In one embodiment, the calibration parameters comprise extrinsic parameters that relate to one or more of relative positioning and orientation with respect one or more of the devices. In one embodiment, the positioning and orientation are with respect to an infrared (IR) camera, the IR camera being one of the devices.

Figure 3:
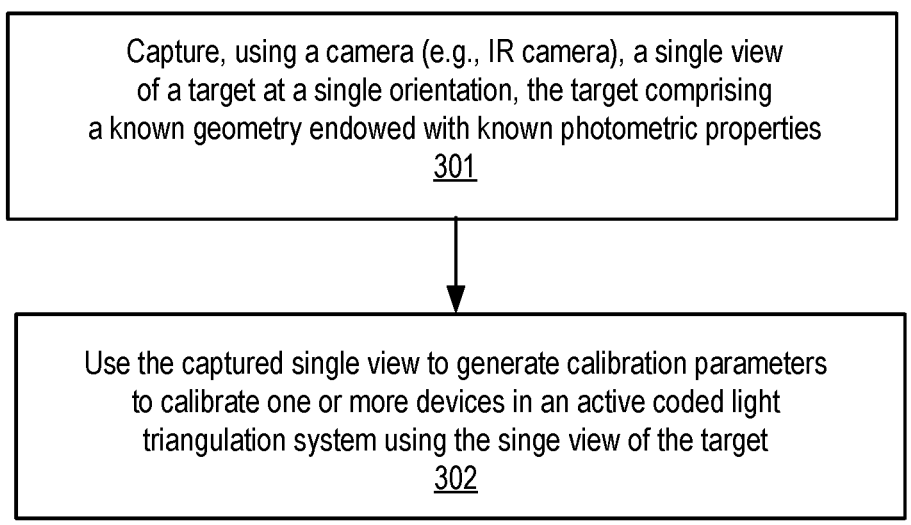
FIG. 3 is a flow diagram of one embodiment of a single view calibration process.

FIG. 3 is a flow diagram of one embodiment of a single view calibration process. The process is performed by processing logic that may comprise hardware (circuitry, dedicated logic, etc.), software (such as is run on a general purpose computer system or a dedicated machine), firmware, or a combination of these three.

Referring to FIG. 3, the processing begins by capturing, using a camera (e.g., IR camera), a single view of a target at a single orientation, the target comprising a plurality of known geometry endowed with known photometric properties (processing block 301). In one embodiment, the target is planar and the plurality of plane geometries comprises seven plane geometries. In one embodiment, the plurality of plane geometries comprises an identical pattern.

Next, processing logic performs a single view calibration process using the captured single view to generate calibration parameters to calibrate one or more devices in an active coded light triangulation system using the single view of the target (processing block 302). In one embodiment, the calibration parameters comprise intrinsic parameters that relate to one or more of lens parameters of one or more of the devices. In one embodiment, the calibration parameters comprise extrinsic parameters that relate to one or more of relative positioning and orientation with respect to one or more of the devices. In one embodiment, the positioning and orientation are with respect to an infrared (IR) camera, the IR camera being one of the devices.

In one embodiment, performing a single view calibration process comprises setting one or more calibration parameters based on alignment of a captured image to a corresponding synthesized image. In one embodiment, performing a single view calibration process comprises updating intrinsic and extrinsic calibration parameters and a viewpoint based on closeness of a match between the captured image and the corresponding synthesized image.

In one embodiment, the single view calibration process comprises a rough calibration process, a depth refinement process and a texture (e.g., RGB) camera calibration process. In one embodiment, performing a single view calibration process comprises performing texture (e.g., RGB) camera calibration, including setting intrinsic and extrinsic parameters of the texture (e.g., RGB) camera. In one embodiment, performing texture (e.g., RGB) camera calibration occurs after generating intrinsic and extrinsic calibration parameters of an IR camera and IR projector among the devices and fixing a viewpoint of the system.

In one embodiment, the single target view calibration process includes three stages: a rough calibration stage, a depth refinement stage and an RGB camera calibration stage. These are described below in more detail.

Stage 1: An Exemplary Rough Calibration Process

The first stage of the single target view calibration process is referred to herein as a rough calibration process. In one embodiment, the rough calibration process begins by capturing an image of the target with uniform illumination by the IR camera and capturing another image of a known project or pattern, which is projected on the target, as well. These two images are captured with the capture device when the capture device is operating with a first, or current, set of parameters.

Processing logic (e.g., a processor executing instructions) synthesizes images of the target and the projected pattern, referred to herein as, "synthesized images", which are as would be seen by the system with the current parameters, for example, given a rough initialization, e.g., nominal settings, of the camera and project or intrinsic parameters, the projector extrinsic parameters, and the viewpoint (relative location and orientation) of the device with respect to the target) and assuming the geometry of the target to be precisely known. These synthesized images may be created by the capture device or created by a device (e.g., server, computer system, etc.) remote to the capture device. Also, these synthesized images may be created either before, during or after the capture of the two images by the camera of the capture device.

Note that the actual captured images will have some misalignment with the synthesized images. The calibration parameters may be determined to align the captured image to the corresponding synthesized image. That is, the calibration parameters are set based on the alignment between the captured images and their corresponding synthesized images. For example, the synthesized images may be matched against their actually captured counterparts, and the capture device intrinsic and extrinsic parameters as well as the viewpoint are updated to produce the best match in the sense of some error criterion, e.g., un-normalized correlation.

In one embodiment, the process is iterative. Images are acquired only once. Synthetic images are re-created every time the calibration parameters change (at every iteration). In one embodiment, first- and second-order partial derivatives of the cost function with respect to the calibration parameters (computed via chain rule) and standard iterative optimization techniques based on these derivatives (variants of Newton's method) are used, and the derivatives indicate how to update the parameters in order to maximally decrease the cost function.

Note that in one embodiment, this first stage operates entirely in the camera image plane using roughly all the pixels in the image to perform calibration, as opposed to the feature-based approaches that rely on a few tens of landmark points. Accordingly, this first stage may provide improved accuracy.

Figure 4:
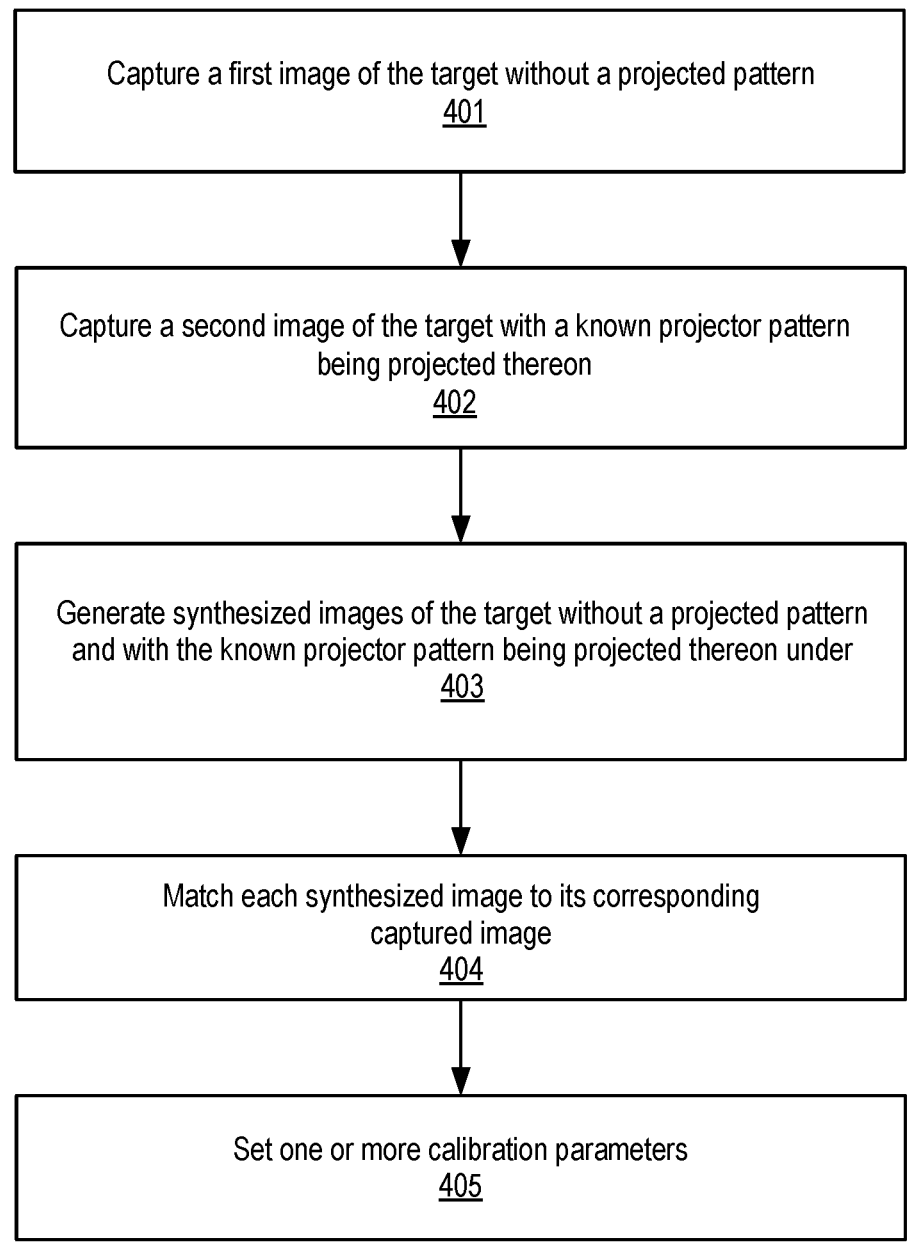
FIG. 4 is a flow diagram of one embodiment of a rough calibration process.

FIG. 4 is a flow diagram of one embodiment of a rough calibration process.

The process is performed by processing logic that may comprise hardware (circuitry, dedicated logic, etc.), software (such as is run on a general purpose computer system or a dedicated machine), firmware, or a combination of these three.

Referring to FIG. 4, the process begins by capturing a first image of the target without a projected pattern (processing block 401).

Processing logic also captures a second image of the target with a known projector pattern being projected thereon (processing block 402).

Processing logic generates synthesized images of the target without a projected pattern and with the known projector pattern being projected thereon under (processing block 403). In one embodiment, generating synthesized images is performed using a first set of parameter settings of camera and projector intrinsic parameters, projector extrinsic parameters and the viewpoint. In one embodiment, the viewpoint comprises the relative location and orientation of the system with respect to the target.

Using the captured images and the synthesized images, processing logic matches each synthesized image to its corresponding captured image (processing block 404). In one embodiment, the matching is the best match based on an error criterion (e.g., un-normalized correlation, normalized correlation, correlation locally weighed according to the confidence of each pixel (e.g., giving more weight to edges and corners), mutual information, and joint entropy, etc.)

Based on the matching, processing logic sets one or more calibration parameters (processing block 405). In one embodiment, system intrinsic and extrinsic parameters as well as the viewpoint are updated based on the matching. In one embodiment, processing logic sets the calibration parameters based on the alignment of a captured image to its corresponding synthesized image.

Note that the above rough calibration process is for structured light. However, a similar process may be used for a passive/assisted stereo.

Stage 2: An Exemplary Depth Refinement Process

The second stage of the single target view calibration process is referred to herein as a depth refinement process. In one embodiment, the depth refinement process begins by acquiring an image of a projected code by decoding a sequence of patterns projected by the projector. Then, a range (depth) image is reconstructed by triangulation using the current system parameters and is matched against a calculated range image of the known target that would be seen by the camera with current intrinsic parameters from the current viewpoint. In one embodiment, the calculated range image may be created by the capture device or created by a device (e.g., server, computer system, etc.) remote to the capture device. Also, this calculated range image may be created either before, during or after the image capture by the camera of the capture device.

Next, the depth refinement process, the images are matched against each other with a goal of minimizing a geometric error criterion, e.g., a squared Euclidean distance. As with the rough calibration process above, in one embodiment, the process is iterative. The captured image is acquired only once. The calculated range image is re-created every time the calibration parameters change (at every iteration). In one embodiment, first- and second-order partial derivatives of the cost function with respect to the calibration parameters (computed via chain rule) and standard iterative optimization techniques based on these derivatives (variants of Newton's method) are used, and the derivatives indicate how to update the parameters in order to maximally decrease the cost function.

Note that in one embodiment, the second stage works in the world coordinates, thereby reducing, and potentially minimizing, the actual geometric error of the reconstructed range image, and is also free of any use of landmark points.

Figure 5:
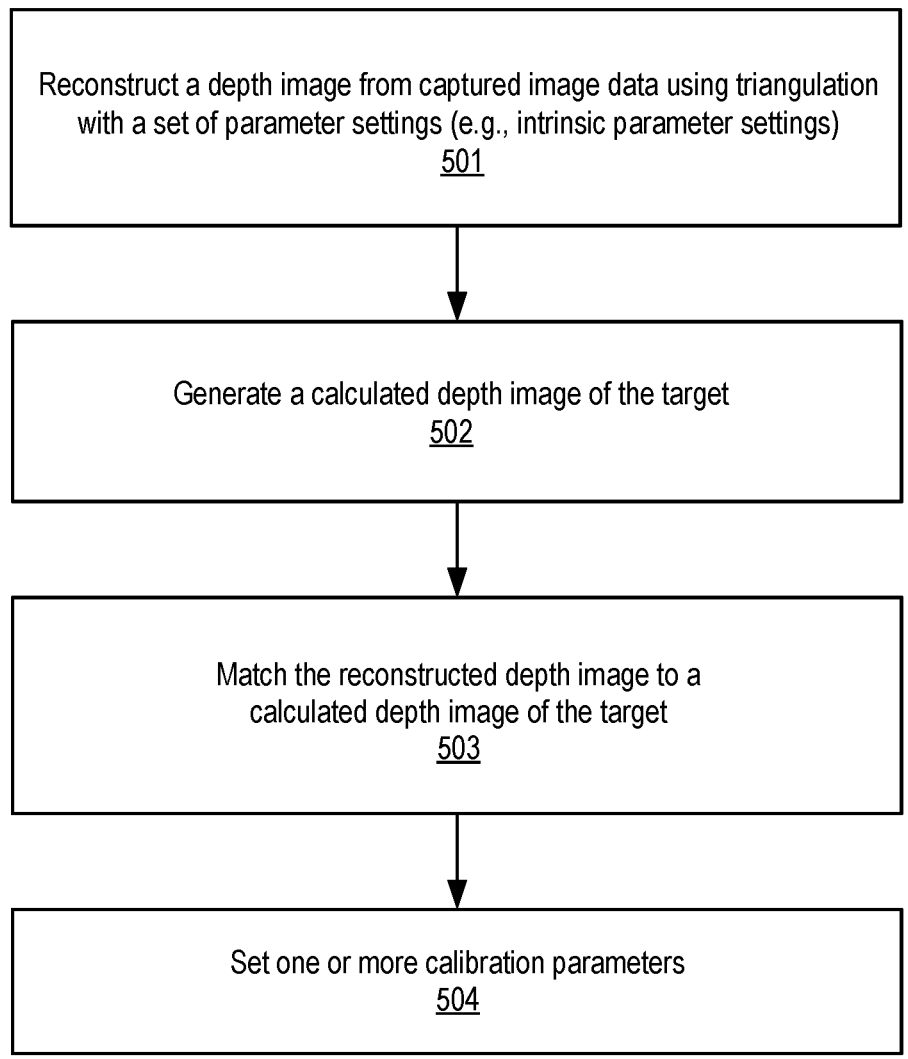
FIG. 5 is a flow diagram of one embodiment of a process for performing a depth refinement.

FIG. 5 is a flow diagram of one embodiment of a process for performing a depth refinement. The process is performed by processing logic that may comprise hardware (circuitry, dedicated logic, etc.), software (such as is run on a general purpose computer system or a dedicated machine), firmware, or a combination of these three.

Referring to FIG. 5, the process begins by processing logic reconstructing a depth image from captured image data using triangulation with a set of parameter settings (e.g., intrinsic parameter settings) (processing block 501).

Processing logic also generates a calculated depth image of the target (processing block 502). In one embodiment, the calculated depth image is an image of the target that would be seen by the camera (e.g., IR camera) with the same set of parameter settings (e.g., intrinsic parameter settings) that are used to reconstruct the depth image.

Once the depth image has been reconstructed and the calculated depth image of the target has been generated, processing logic matches the reconstructed depth image to a calculated depth image of the target (processing block 503). In one embodiment, the matching is performed by reducing, and potentially minimizing, a geometric error criterion (e.g., a mean squared Euclidean distance, etc.). While use of the Euclidean distances makes sense at individual points, aggregation of multiple points allows a lot of freedom and others that may be used include:

1. Mean Euclidean distance (aka the L1 norm)
2. Maximum Euclidean distance (aka worst-case error or L-infinity norm).
3. Median Euclidean distance The above (except 2) can be further weighed locally according, e.g., pixel confidence.

Based on the results of matching between the reconstructed depth image to the calculated depth image, processing logic sets one or more calibration parameters (processing block 504).

Stage 3: An Exemplary RGB Camera Calibration Process

The third stage of one embodiment of the single target view calibration process is referred to herein as a RGB camera calibration process. In one embodiment, the RGB camera calibration process begins using the intrinsic parameters and extrinsic parameters of the IR camera and projector, and the viewpoint of the entire system being fixed. Under these conditions, the intrinsic and extrinsic calibration of the RGB camera is performed.

In one embodiment, the process starts by acquiring, with the RGB camera, an image of the target with visible light illumination. The camera is set to operate according to a set of current parameters. This captured image is matched against a synthesized texture image of the known target that would be seen by the RGB camera with the same current parameters. The synthesized texture image may be created by the capture device or created by a device (e.g., server, computer system, etc.) remote to the capture device. Also, the synthesized texture image may be created either before, during or after the capture of the image by the camera of the capture device. In one embodiment, the actual reconstructed depth is used to construct the synthetic texture image.

In one embodiment, the two images are matched and the RGB camera parameters are updated to achieve the best match in the sense of some criterion, e.g., radiometrically corrected correlation.

In one embodiment, similar to the two stages above, the process is iterative. The captured images is acquired only once, while the synthetic image is re-created every time the calibration parameters change (at every iteration). In one embodiment, first- and second-order partial derivatives of the cost function with respect to the calibration parameters (computed via chain rule) and standard iterative optimization techniques based on these derivatives (variants of Newton's method) are used, and the derivatives indicate how to update the parameters in order to maximally decrease the cost function.

Figure 6:
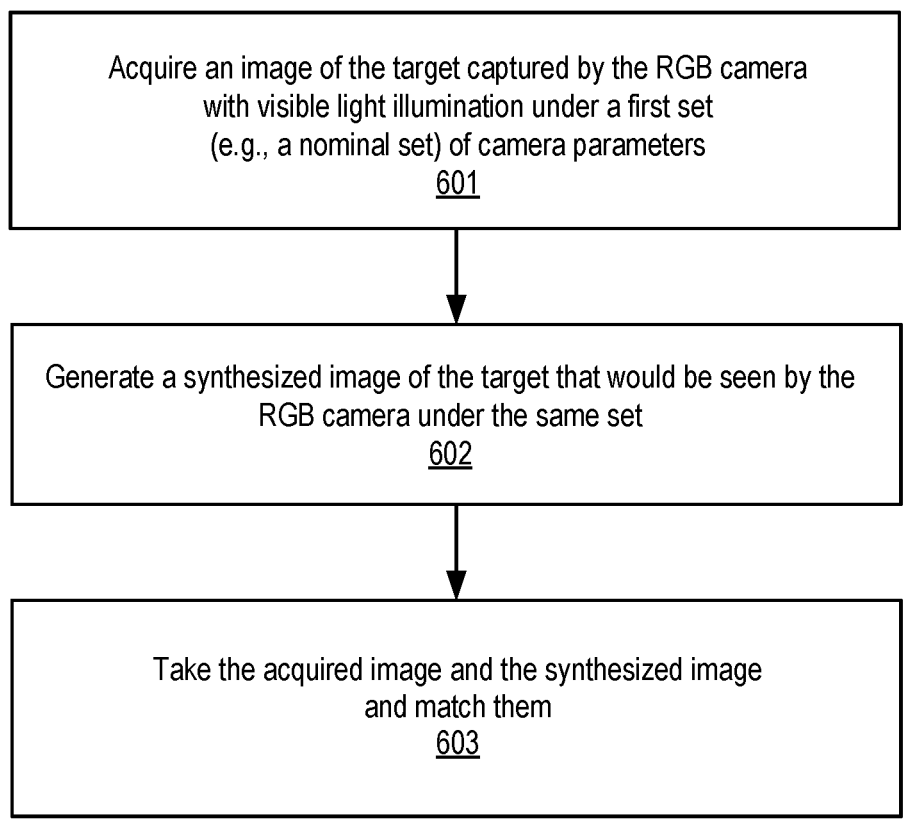
FIG. 6 is a flow diagram of one embodiment of a process for performing RGB camera calibration.

FIG. 6 is a flow diagram of one embodiment of a process for performing RGB camera calibration. The process is performed by processing logic that may comprise hardware (circuitry, dedicated logic, etc.), software (such as is run on a general purpose computer system or a dedicated machine), firmware, or a combination of these three.

Referring to FIG. 6, the process begins by processing logic acquiring an image of the target captured by the RGB camera with visible light illumination under a first set (e.g., a nominal set) of camera parameters (processing block 601). In one embodiment, the acquisition of the image of the target occurs with the RGB camera.

Next, processing logic generates a synthesized image of the target that would be seen by the RGB camera under the same set (e.g., the nominal set) of camera parameters (processing block 602).

Processing logic takes the acquired image and the synthesized image and matches them (processing block 603) and determines updates one or more parameters in the first set of camera parameters that would result in a best match the acquired image against to the synthesized image according to a criterion (e.g., radiometrically corrected correlation, etc.).

In one embodiment, these three stages are performed using a single view of the target.

One Example Mathematical Description of the Three Stages

The three stages may be described in mathematical terms using the following. Note that a description of the notational format is provide first and then one embodiment of each of the three stages is described.

In one embodiment, the world coordinates are measured with respect to the IR camera (optical axis being the z axis) and denoted by the four-dimensional vector X in homogeneous coordinates. IR camera, projector and RGB camera image plane coordinates are denoted by the three-dimensional vectors $x_c$, $x_p$ and $x_t$, respectively, in homogeneous coordinates. The intrinsic parameters of the IR camera are collectively denoted herein by the vector $\theta_c$ and in one embodiment include the ideal perspective projection matrix and the inverse distortion parameters. The parametric map assigning a ray $r_c$ in world coordinates to every location $x_c$ in the IR camera image plane is denoted by $r_c = R(x_c; \theta_c)$.

Similarly, the intrinsic parameters of the projector are collectively denoted as $\theta_p$; furthermore, in one embodiment, the projector is characterized by the extrinsic parameters consisting of the Euclidean transformation $T_p$, relative to the IR camera. The parametric map projecting a point X in world coordinates on the projector image plane is denoted by $x_p = P(T_p X; \theta_p)$.

Finally, the intrinsic and the extrinsic parameters of the RGB camera are denoted as $\theta_t$ and $T_t$, respectively, and each location $x_t$ in the camera image plane maps to the ray $r_t = T_t R_t(x_t; \theta_t)$ in world coordinates.

Given location $x_c$ in the IR camera image plane and a corresponding one-dimensional projector code corresponding to the plane defined by the given coordinate $x_p$ in the projector image plane (without loss of generality, it is assumed to be the first coordinate $x_p$). The intersection of the ray emanating from the IR camera focal point and passing through $x_c$ with the plane corresponding to $x_p$ in world coordinates can be expressed as $X = pr_c$, where p is the range given by the triangulation operator $p = T(x_c, x_p, \theta_c, \theta_p, T_p)$. In one embodiment, this map depends on the intrinsic and extrinsic calibration parameters, and is applied by the range camera to reconstruct the depth image.

To describe a known calibration target viewed from a given viewpoint, the viewpoint transformation with respect to the IR camera is denoted by $T_v$. Given a ray r in world coordinates, the range at which it intersects the calibration target is denoted by $r = O(T_v r)$, and the corresponding point in world coordinates is denoted by $X = rr$. The texture (albedo) of the object at the intersection point is denoted by $l(T_v, r)$.

Image Plane Calibration and IR Camera Projector (Stage 1—Rough Calibration)

As the input of this stage, the calibration unit is given a uniformly illuminated image I, of the calibration target and an image $I_p$ of the target with the illumination by a known projector pattern described by the function $p(x_p)$ in the projector plane. (Though images of multiple patterns can be used, the following discussion is restricted to a single pattern for the sake of simplicity.) In one embodiment, the image $I_p$ is normalized against the fully illuminated image $I_1$, creating the image $N_p$.

For every location $x_c$ in the IR camera image plane, the measured intensity of the object texture is $I_1(x_c)$. If the IR camera had the intrinsic parameters $\theta_c$ and the calibration target were viewed from the viewpoint $T_v$, the camera would observe an intensity given by $I(T_v R(x_c; \theta_c))$. Similarly, if the IR projector were further described by the set of parameters $\theta_p$ and $T_p$, the observed intensity $N_p(x_c)$ of the normalized image at the location would be created by projecting that intensity from the point $P(T_p O(T_v R(x_c; \theta_c))R(x_c; \theta_c); \theta_p)$ in the projector image plane.

In one embodiment, calibration is performed by matching the synthetic object texture image against the observed image $I_1$, and the synthetic pattern in the projector image plane against the observed normalized image $N_p$. Denoting an additive matching cost between two intensity values by D, the minimization problem is solved as follows:

$$\min_{\theta_c, \theta_p, T_p, T_v} \sum_{x_c} D(I_1(x_c), (T_v R(x_c; \theta_c))) + \lambda D(N_p(x_c), p(P(T_p O(T_v R(x_c; \theta_c))R(x_c; \theta_c); \theta_p)))$$

where $\lambda$ is a parameter controlling the relative importance of the pattern image, the sum is taken over all the pixels in the input images or a subset thereof, and optimization is performed over the calibration parameters within a certain range of feasible values. For example, in one embodiment, for each of the parameters, a tolerance around its nominal value can be used as a simple constraint. Note that additivity is assumed for the sake of simplified explanation; another more general form of the matching cost can be handled straightforwardly. In one embodiment, D was set to be unnormalized correlation.

Standard continuous optimization techniques can be used here, such as, for example, but not limited to gradient descent, conjugate gradients, and Newton's method. In one embodiment, second-order projected Newton steps are alternatively applied to blocks of parameters, and a grid search is used on several parameters to avoid convergence to local minima.

World Calibration of IR Camera and Projector (Stage 2—Depth Refinement)

In one embodiment, this stage refines the calibration parameters found at the previous stage by directly minimizing reconstruction error. For every location $x_c$ in the IR camera image plane, the reconstructed range with the current calibration parameters is $T(x_c, x_p; \theta_c, \theta_p, T_p)R(x_c; \theta_c)$. On the other hand, the range to the known calibration target is $O(T_v R(x_c; \theta_c))$.

In one embodiment, calibration is performed by matching the synthetic range image against the one obtained with the current parameters. This leads to the following optimization problem, $$\min_{\theta_c, \theta_p, T_p, T_v} \sum_{x_c} (T(x_c, x_p; \theta_c \theta_p, T_p)R(x_c; \theta_c) - O(T_v R(x_c; \theta_c)))^2,$$

where, for simplicity, the sum of squared $l_2$ distances is used as the mismatch criteria. Note that other criteria could be used, such as, for example, but not limited to gradient descent, conjugate gradients, and Newton's method.

Standard continuous optimization techniques can be used here. In one embodiment, second-order projected Newton steps are alternatively applied to blocks of parameters. In one embodiment, IR camera distortion parameters are enforced through a penalty function augmenting the objective.

RGB Camera Calibration (Stage 3)

The purpose of this stage is to calibrate the RGB intrinsic and extrinsic parameters after the IR camera and projector have been already calibrated, and the viewpoint $T_v$ of the calibration target has been established.

In one embodiment, the input to this stage is the illuminated calibration target captured through the RGB camera, of which the achromatic channel J is kept, possibly radiometrically corrected. For every location $x_t$ in the image J, the observed intensity is $J(x_t)$. If the RGB camera had the instrinsic parameters $\theta_p$ and extrinsic parameters $T_t$, the camera would observe an intensity given by $l(T_v T_t R(x_p; \theta_p))$.

In one embodiment, calibration is performed again by minimizing the discrepancy between the observed and the synthetic texture images, solving the minimization problem.

$$\min_{\theta_t, T_t} \sum_{x_t} D(J(x_t), I(T_v T_t R(x_p; \theta_p)))$$

Note that the mismatch criterion D may differ from the one chosen at the first stage.

The calibration techniques described herein have a number of advantages, including, but not limited to, simplifying the calibration tester, making such a tester less costly and smaller in space and test floor requirements than prior art calibration testers.

One Embodiment of a Triangulation Process with an Exemplary Forward Model

Pattern Camera

Given a point x in world coordinates, it is projected onto the camera image plane by the following pin-hole model:

$$x_c' = K_c(I0)x \quad (1)$$

where $x_c$ is a 4×1 vector representing the world point location in homogenous coordinates, $K_c$ is the 3×3 upper-triangular intrinsic camera matrix, $$K_c = \begin{pmatrix} f_x & & c_x \\ & f_y & c_y \\ & & 1 \end{pmatrix}, \quad (2)$$

and $x_c$ is the 3×1 vector of uncorrected homogenous camera coordinates. The camera system of coordinates is assumed to coincide with the world coordinate system, therefore trivial rotation and translation (extrinsic) matrices are imposed.

Pattern Camera Lens Distortion

To account for the lens distortion, a parametric distortion model is applied. The corrected camera coordinates vector $x_c$ is related to its uncorrected counterpart $x_c'$ through the following inverse model given by $$x_c' = K_c D_\alpha(K_c^{-1} x_c) \quad (3)$$

where D is a plane-to-plane map given by $$x' = (1 + \alpha_1 p^2 + \alpha_2 p^4 + \alpha_3 p^6)x + 2\alpha_4 r y + \alpha_5(p^2 + 2x^2)$$

$$y' = (1 + \alpha_1 p^2 + \alpha_2 p^4 + \alpha_3 p^6)y + 2\alpha_5 r y + \alpha_4(p^2 + 2y^2) \quad (4)$$

with $p^2 = x'^2 + y'^2$. The parameters $\alpha_1, \alpha_2, \alpha_3$ govern the radial distortion component, while $\alpha_4$ and $\alpha_5$ account for the tangential one. The vector $\alpha = (\alpha_1, \ldots \alpha_5)^T$ is referred to herein as to the camera inverse distortion parameters. Note that the difference between this inverse model versus the standard forward model used in other systems. The benefits of the teachings described herein will be evident when the reconstruction process is disclosed.

Projector

The projector is modeled as a one-dimensional pin-hole system $$x_p = K_p(R_p t_p)x = P_p x, \quad (5)$$

where $x_p$ is the 2×1 vector of homogenous coordinate on the projector line, $K_p$ is the 2×3 intrinsic matrix, and $R_p$ and $t_p$ are the extrinsic rotation and translation transformation Parameters, respectively, relating between the camera and the projector coordinate systems. In one embodiment, the intrinsic and the extrinsic projector parameters are combined into a single 2×4 projection matrix $P_p$.

Texture Camera

The texture camera is modeled as a two-dimensional pin-hole system $$x_t' = K_t(R_t t_t)x = P_t x, \quad (6)$$

where $x_t$ is the 3×1 uncorrected vector of homogenous coordinate on the camera plane, $K_t$ is the 3×3 intrinsic matrix, and $R_t$ and $t_t$ are the extrinsic rotation and translation transformation parameters, respectively, relating between the pattern and the texture cameras coordinate systems. In one embodiment, the intrinsic and the extrinsic texture camera parameters are combined into a single 3×4 projection matrix $P_t$.

Texture Camera Lens Distortion

To account for the lens distortion, a forward parametric distortion model is applied:

$$x_t = K_t D_\beta(K_t^{-1} x_t') \quad (7)$$

where D is a plane-to-plane map given by $$x = (1 + \beta_1 p^2 + \beta_2 p^4 + \beta_3 p^6)x' + 2\beta_4 x' y' + \beta_5(p^2 + 2x^2)$$

$$y = (1 + \beta_1 p^2 + \beta_2 p^4 + \beta_3 p^6)y' + 2\beta_5 x' y' + \beta_4(p^2 + 2y^2) \quad (8)$$

with $p^2 = x'^2 + y'^2$. The parameters $\beta_1$, $\beta_2$, $\beta_3$ govern the radial distortion component, while $\beta_4$ and $\beta_5$ account for the tangential one. For purposes herein, the vector $\beta = (\alpha_1, \ldots \beta_5)^T$ is referred to as the texture camera forward distortion parameters. The forward model is applied by transforming directly the texture image using D. In one embodiment, the process is performed on the host system due to the requirement of random access to the frame buffer.

Depth Reconstruction

The purpose of depth reconstruction is to establish for each pixel in the pattern camera image its distance from the camera center of coordinates. The term "depth" shall be understood as either the said distance r or its projection z onto the optical axis of the pattern camera.

Given a pixel at position $x_c = (x_c, y_c, 1)^T$ in the camera image plane and the corresponding code value $x_p = (x_p, 1)^T$ of the projector, by applying the inverse distortion model (7), a corrected pixel location $x_c' = (x_c', y_c', 1)^T$ is obtained. The pinhole camera projection (1) introduces ambiguity by projecting all points along the ray $x = rd$, $r > 0$, to $x_c'$.

In order to characterize the ray $d = (d_x; d_y; d_z)^T$, the following is written $$\beta x_c' = K_c d, \quad (9)$$

where $\beta \neq 0$ is an arbitrary scaling factor. This yields $$d_z x_c' = (K_c)_1^T d = f_x d_x + c_x d_z$$

$$d_z y_c' = (K_c)_2^T d = f_y d_y + c_y d_z \quad (10)$$

where $(K_c)_i^T$ denotes the i-th row vector of $K_c$. Solving for $d_x$, $d_y$ and $d_z$ gives $$d = \begin{pmatrix} f_x^{-1}(x_c' - c_x) \\ f_y^{-1}(y_c' - c_y) \\ 1 \end{pmatrix} \quad (11)$$

Since the pixel grid is fixed at reconstruction, in one embodiment, the described process is precomputed for every pixel in the image.

The projector forward model (6) introduces ambiguity by projecting an entire plane onto $x_p$; however, the intersection of the latter plane with the ray $x = rd$ yields a unique point in space. Substituting the unit direction $d = d/\|d\|$ into the projector model gives $$\beta x_p = P_p \begin{pmatrix} rd \\ 1 \end{pmatrix}, \quad (12)$$

which can be rewritten as $$\beta x_p = \frac{r p_1^T d + 1 q_1}{r p_2^T d + 1 q_2} = \frac{r p_1^T d + 1 q_1 \|d\|}{r p_2^T d + 1 q_2 \|d\|} \quad (13)$$

where the projector matrix is decomposed into $$P_p = \begin{pmatrix} p_1^T q_1 \\ p_2^T q_2 \end{pmatrix}. \quad (14)$$

Solving for r, one has the depth $$r = \frac{T_1 x_p + T_2}{T_3 x_p + T_4} \quad (15)$$

where $$T_1 = q_2 \|d\| \quad (16)$$
$$T_2 = -q_1 \|d\|$$
$$T_3 = p_2^T d$$
$$T_4 = -p_1^T d$$

are scalar coefficients depending only on the pixel location $x_c$ (and therefore can be precomputed). For purposes herein, $T_1, \ldots T_4$ are referred to as range triangulation coefficients. Note that using the unnormalized ray saves one division operation.

The depth r can be further projected onto $d_z$ yielding $$z = \frac{T_1 x_p + T_2 d_z}{T_3 x_p + T_4 \|d\|} \quad (17)$$

$$= \frac{T_1' x_p + T_2'}{T_3 x_p + T_4}$$

where $$T_1' = q_2 d_z \quad (18)$$
$$T_2' = q_1 d_z$$

are the modified coefficients.

Texture Map Reconstruction

Once the range has been established, the texture map coordinates are reconstructed using the forward model $$x_t = P_t \begin{pmatrix} rd \\ 1 \end{pmatrix} = P_t \begin{pmatrix} rd \\ \|d\| \end{pmatrix} \quad (19)$$

from where $$x_t = \frac{r p_1^T d + q_1 \|d\|}{r p_3^T d + q_3 \|d\|} \quad y_t = \frac{r p_2^T d + q_2 \|d\|}{r p_3^T d + q_3 \|d\|} \quad (20)$$

where $(p_i^T q_i)$ is the i-th row of $P_t$. This can be rewritten as $$x_t = \frac{\sigma_1 r + \sigma_4}{\sigma_3 r + \sigma_6} \quad (21)$$

$$y_t = \frac{\sigma_2 r + \sigma_5}{\sigma_3 r + \sigma_6},$$

where $$\sigma_1 = p_1^T d \quad (22)$$
$$\sigma_2 = p_2^T d$$
$$\sigma_3 = p_3^T d$$
$$\sigma_4 = q_1 \|d\|$$
$$\sigma_5 = q_2 \|d\|$$
$$\sigma_6 = q_3 \|d\|.$$

In case the output depth is projected onto the camera optical axis, texture coordinates are obtained from $r = z\|d\|/d_z$, $$x_t = \frac{zp_1^T d\|d\| + q_1\|d\|d_z}{rp_3^T d + q_3\|d\|} \frac{zp_1^T + q_1 d_z}{zp_3^T d + q_3 d_z} \quad (23)$$

and, similarly, $$y_t = \frac{zp_2^T d + q_2 d_z}{zp_3^T d + q_3 d_z} \quad (24)$$

This can be expressed as (21) with $\sigma_4$, $\sigma_5$ by $\sigma_6$ replaced by $$\sigma_4' = q_1 d_z$$
$$\sigma_5' = q_2 d_z$$
$$\sigma_6' = q_3 d_z. \quad (25)$$

Coefficient Scaling and Precomputation

In the following, a compact and efficient way to compute the coefficients $T_i$ and $\sigma_i$ is disclosed. It assumes the pattern camera coordinates to be unnormalized and translated from $[-1, 1]^2$ to $[0, W-1] \times [0, H-1]$; the projector coordinate is assumed to be translated from $[-1, 1]$ to $[0; s_2-1]$ ($s_2 = 2^{15}-1$ in one embodiment); the output range or depth is mapped from the interval $[0; r_{max}]$ to $[0, 2^{16}-1]$ by the scaling factor $s_1$; and the texture map coordinates are computed translated from $[-1, 1]$ to $[0, s_{uv}]$ with $s_{uv} = 2^{12}-1$ in one embodiment.

Inverse Camera Distortion Model

Substituting the scales into the camera distortion model, the following is obtained with appropriate scaling $$x = \frac{2}{W f_x} x_c - \frac{H f_y}{2 f_x} (c_x + 1) \quad (26)$$

$$y = y_c - \frac{H}{2}(c_y + 1).$$

The distortion model becomes $$x' = (1 + d_1 p^2 + d_2 p^4 + d_3 p^6) x + 2 d_4 xy + d_5 (p^2 + 2x^2)$$

$$y' = (1 + d_1 p^2 + d_2 p^4 + d_3 p^6) y + 2 d_5 xy + d_4 (p^2 + 2y^2) \quad (27)$$

$p^2 = x^2 + y_2$ and $d_i$ are the distortion parameters scaled according to $$d_1 = \left(\frac{2}{H f_y}\right)^2 \alpha_1 \quad (28)$$

$$d_2 = \left(\frac{2}{H f_y}\right)^4 \alpha_2$$

$$d_3 = \alpha_3$$

$$d_4 = \left(\frac{2}{H f_y}\right)^2 \alpha_4$$

$$d_5 = \left(\frac{2}{H f_y}\right)^2 \alpha_5.$$

Ray direction. With the selected scaling, the unnormalized ray d passing through the pixel becomes $$d = \left(x', y', \frac{H f_y}{2}\right), \quad (29)$$

and its norm $$\|d\| = \sqrt{x'^2 + y'^2 + q}, \quad (30)$$

where $$q = \left(\frac{H f_y}{2}\right)^2 \quad (31)$$

Range Coefficients

In one embodiment, range coefficients assume the form $$T_1 = p_1\|d\| \quad (32)$$
$$T_2 = p_2\|d\|$$
$$T_3 = p_3 x' + p_4 y' + p_5$$
$$T_4 = p_6 x' + p_7 y' + p_8$$

where $$p_1 = (P_p)_{22} s_1 \quad (33)$$
$$p_2 = -s_1 s_2 ((P_p)_{14} + (P_p)_{24})$$
$$p_3 = -(P_p)_{21}$$
$$p_4 = -(P_p)_{22}$$
$$p_5 = -(P_p)_{23} \frac{H}{2} f_y$$
$$p_6 = s_2((P_p)_{11} + (P_p)_{21})$$
$$p_7 = s_2((P_p)_{12} + (P_p)_{22})$$
$$p_8 = s_2((P_p)_{13} + (P_p)_{23})\frac{H}{2} f_y$$

are precomputed from the system parameters. Depth reconstruction is obtained with $$T_1' = p_1'$$
$$T_2' = p_2' \quad (34)$$

where $$p_1' = p_1 \sqrt{q}$$
$$p_2' = p_2 \sqrt{q}. \quad (35)$$

Texture Map Coefficients

Texture map coefficients are precomputed as $$\sigma_1 = x' + h_0 y' + h_1 \quad (36)$$
$$\sigma_2 = h_2 x' + h_3 y' + h_4$$
$$\sigma_3 = h_5 x' + h_6 y' + h_7$$
$$\sigma_4 = h_8 \|d\|$$
$$\sigma_5 = h_9 \|d\|$$
$$\sigma_6 = h_{10} \|d\|,$$

where

-continued $$h_0 = \frac{(P_t)_{12} + (P_t)_{32}}{(P_t)_{11} + (P_t)_{31}} \quad (37)$$

$$h_1 = \frac{(P_t)_{13} + (P_t)_{33}}{(P_t)_{11} + (P_t)_{31}} \frac{H}{2} f_y$$

$$h_2 = \frac{(P_t)_{21} + (P_t)_{31}}{(P_t)_{11} + (P_t)_{31}}$$

$$h_3 = \frac{(P_t)_{22} + (P_t)_{32}}{(P_t)_{11} + (P_t)_{31}}$$

$$h_4 = \frac{(P_t)_{23} + (P_t)_{33}}{(P_t)_{11} + (P_t)_{31}} \frac{H}{2} f_y$$

$$h_5 = \frac{(P_t)_{31}}{(P_t)_{11} + (P_t)_{31}} \frac{2}{s_{uv}}$$

$$h_6 = \frac{(P_t)_{32}}{(P_t)_{11} + (P_t)_{31}} \frac{2}{s_{uv}}$$

$$h_7 = \frac{(P_t)_{33}}{(P_t)_{11} + (P_t)_{31}} \frac{H}{s_{uv}} f_y$$

$$h_8 = \frac{(P_t)_{14} + (P_t)_{34}}{(P_t)_{11} + (P_t)_{31}} \frac{H}{2} s_1$$

$$h_9 = \frac{(P_t)_{24} + (P_t)_{34}}{(P_t)_{11} + (P_t)_{31}} s_1$$

$$h_{10} = 2 \frac{(P_t)_{34}}{(P_t)_{11} + (P_t)_{31}} \frac{s_1}{s_{uv}}.$$

When texture map is reconstructed from z rather than from r, $$\sigma_4' = h_8'$$

$$\sigma_5' = h_9'$$

$$\sigma_6' = h_{10}' \quad (38)$$

are used with $$h_8' = h_8 \sqrt{q}$$

$$h_9' = h_9 \sqrt{q}$$

$$h_{10}' = h_{10} \sqrt{q} \quad (39)$$

FIG. 7 illustrates an example of coefficient precomputation. FIG. 8 illustrates an example of range and texture reconstruction and coefficient precomputation.

Figure 9:
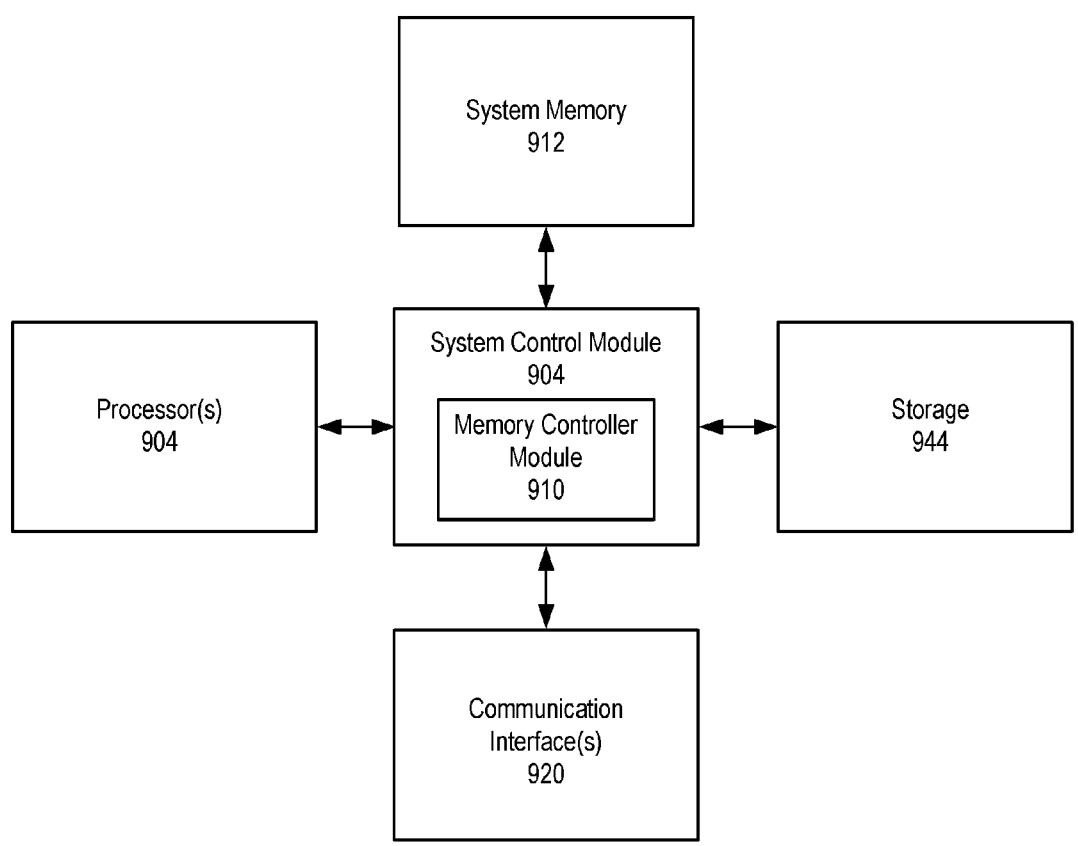
FIG. 9 is a block diagram of one embodiment of a system.

FIG. 9 illustrates, for one embodiment, an example system 900 having one or more processor(s) 904, system control module 908 coupled to at least one of the processor(s) 904, system memory 912 coupled to system control module 908, non-volatile memory (NVM)/storage 914 coupled to system control module 908, and one or more communications interface(s) 920 coupled to system control module 908. In some embodiments, the system 900 may include capture device 100 and provide logic/module that performs functions aimed at depth and texture calibration, along with depth reconstruction and other functions, described herein.

In some embodiments, the system 900 may include one or more computer-readable media (e.g., system memory or NVM/storage 914) having instructions and one or more processors (e.g., processor(s) 904) coupled with the one or more computer-readable media and configured to execute the instructions to implement a module to perform depth and texture calibration, along with depth reconstruction and other functions, described herein.

System control module 908 for one embodiment may include any suitable interface controllers to provide for any suitable interface to at least one of the processor(s) 904 and/or to any suitable device or component in communication with system control module 908.

System control module 908 may include memory controller module 910 to provide an interface to system memory 912. The memory controller module 910 may be a hardware module, a software module, and/or a firmware module. System memory 912 may be used to load and store data and/or instructions, for example, for system 900. System memory 912 for one embodiment may include any suitable volatile memory, such as suitable DRAM, for example. System control module 908 for one embodiment may include one or more input/output (I/O) controller(s) to provide an interface to NVM/storage 914 and communications interface(s) 920.

The NVM/storage 914 may be used to store data and/or instructions, for example. NVM/storage 914 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 914 may include a storage resource physically part of a device on which the system 900 is installed or it may be accessible by, but not necessarily a part of, the device. For example, the NVM/storage 914 may be accessed over a network via the communications interface(s) 920.

Communications interface(s) 920 may provide an interface for system 900 to communicate over one or more network(s) and/or with any other suitable device. The system 900 may wirelessly communicate with the one or more components of the wireless network in accordance with any of one or more wireless network standards and/or protocols.

For one embodiment, at least one of the processor(s) 904 may be packaged together with logic for one or more controller(s) of system control module 908, e.g., memory controller module 910. For one embodiment, at least one of the processor(s) 904 may be packaged together with logic for one or more controllers of system control module 908 to form a System in Package (SiP). For one embodiment, at least one of the processor(s) 904 may be integrated on the same die with logic for one or more controller(s) of system control module 908. For one embodiment, at least one of the processor(s) 904 may be integrated on the same die with logic for one or more controller(s) of system control module 908 to form a System on Chip (SoC).

In various embodiments, the system 900 may have more or less components, and/or different architectures. For example, in some embodiments, the system 900 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 900 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 900 may be any other electronic device.

Figure 11:
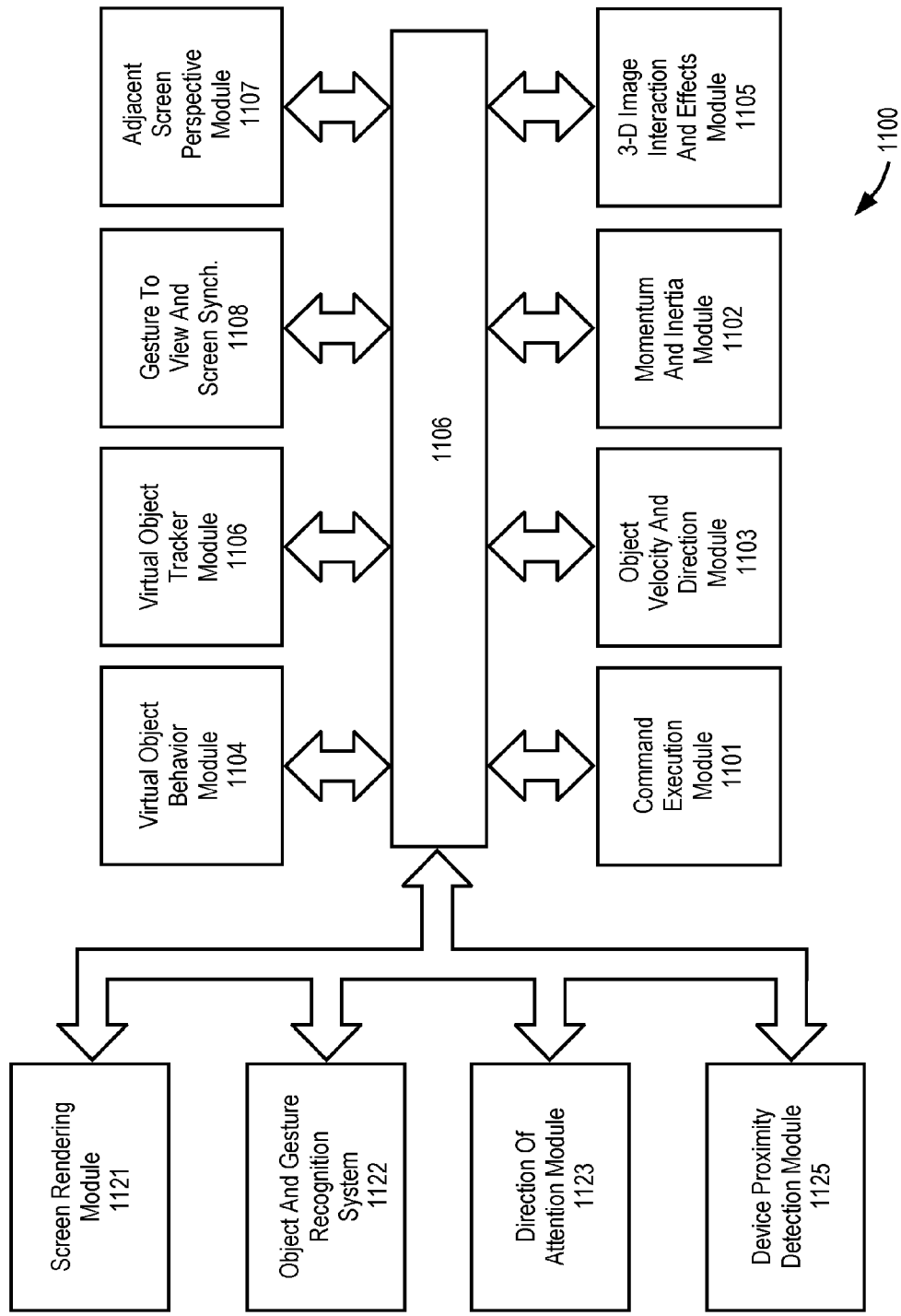
FIG. 11 illustrates an embodiment of a computing environment capable of supporting the operations discussed above.

FIG. 11 illustrates an embodiment of a computing environment 1100 capable of supporting the operations discussed above. The modules described before can use the depth information (e.g., values) and other data described above to perform these functions. The modules and systems can be implemented in a variety of different hardware architectures and form factors.

Command Execution Module 1101 includes a central processing unit to cache and execute commands and to distribute tasks among the other modules and systems shown. It may include an instruction stack, a cache memory to store intermediate and final results, and mass memory to store applications and operating systems. Command Execution Module 1101 may also serve as a central coordination and task allocation unit for the system.

Screen Rendering Module 1121 draws objects on the one or more multiple screens for the user to see. It can be adapted to receive the data from Virtual Object Behavior Module 1104, described below, and to render the virtual object and any other objects and forces on the appropriate screen or screens. Thus, the data from Virtual Object Behavior Module 1104 would determine the position and dynamics of the virtual object and associated gestures, forces and objects, for example, and Screen Rendering Module 1121 would depict the virtual object and associated objects and environment on a screen, accordingly. Screen Rendering Module 1121 could further be adapted to receive data from Adjacent Screen Perspective Module 1107, described below, to either depict a target landing area for the virtual object if the virtual object could be moved to the display of the device with which Adjacent Screen Perspective Module 1107 is associated. Thus, for example, if the virtual object is being moved from a main screen to an auxiliary screen, Adjacent Screen Perspective Module 1107 could send data to the Screen Rendering Module 1121 to suggest, for example in shadow form, one or more target landing areas for the virtual object on that track to a user's hand movements or eye movements.

Object and Gesture Recognition System 1122 may be adapted to recognize and track hand and harm gestures of a user. Such a module may be used to recognize hands, fingers, finger gestures, hand movements and a location of hands relative to displays. For example, Object and Gesture Recognition System 1122 could for example determine that a user made a body part gesture to drop or throw a virtual object onto one or the other of the multiple screens, or that the user made a body part gesture to move the virtual object to a bezel of one or the other of the multiple screens. Object and Gesture Recognition System 1122 may be coupled to a camera or camera array, a microphone or microphone array, a touch screen or touch surface, or a pointing device, or some combination of these items, to detect gestures and commands from the user.

The touch screen or touch surface of Object and Gesture Recognition System 1122 may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by Object and Gesture Recognition System 1122, using one or more cameras, without the benefit of a touch surface.

Direction of Attention Module 1123 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to Object and Gesture Recognition Module 1122 to ensure that the gestures or commands are associated with the appropriate library for the active display. Similarly, if the user is looking away from all of the screens, then commands can be ignored.

Device Proximity Detection Module 1125 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to Object Gesture and Recognition System 1122. For a display device, it may be considered by Adjacent Screen Perspective Module 1107.

Virtual Object Behavior Module 1104 is adapted to receive input from Object Velocity and Direction Module 1103, and to apply such input to a virtual object being shown in the display. Thus, for example, Object and Gesture Recognition System 1122 would interpret a user gesture and by mapping the captured movements of a user's hand to recognized movements, Virtual Object Tracker Module 1106 would associate the virtual object's position and movements to the movements as recognized by Object and Gesture Recognition System 1122, Object and Velocity and Direction Module 1103 would capture the dynamics of the virtual object's movements, and Virtual Object Behavior Module 1104 would receive the input from Object and Velocity and Direction Module 1103 to generate data that would direct the movements of the virtual object to correspond to the input from Object and Velocity and Direction Module 1103.

Virtual Object Tracker Module 1106 on the other hand may be adapted to track where a virtual object should be located in three-dimensional space in a vicinity of a display, and which body part of the user is holding the virtual object, based on input from Object Gesture and Recognition System 1122. Virtual Object Tracker Module 1106 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

Gesture to View and Screen Synchronization Module 1108, receives the selection of the view and screen or both from Direction of Attention Module 1123 and, in some cases, voice commands to determine which view is the active view and which screen is the active screen. It then causes the relevant gesture library to be loaded for Object and Gesture Recognition System 1122. Various views of an application on one or more screens can be associated with alternative gesture libraries or a set of gesture templates for a given view.

Adjacent Screen Perspective Module 1107, which may include or be coupled to Device Proximity Detection Module 1125, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. Adjacent Screen Perspective Module 1107 may, in this way, determine coordinates of an adjacent screen relative to its own screen coordinates. Thus, the Adjacent Screen Perspective Module may determine which devices are in proximity to each other, and further potential targets for moving one or more virtual object's across screens. Adjacent Screen Perspective Module 1107 may further allow the position of the screens to be correlated to a model of three-dimensional space representing all of the existing objects and virtual objects.

Object and Velocity and Direction Module 1103 may be adapted to estimate the dynamics of a virtual object being moved, such as its trajectory, velocity (whether linear or angular), momentum (whether linear or angular), etc. by receiving input from Virtual Object Tracker Module 1106. The Object and Velocity and Direction Module 1103 may further be adapted to estimate dynamics of any physics forces, by for example estimating the acceleration, deflection, degree of stretching of a virtual binding, etc. and the dynamic behavior of a virtual object once released by a user's body part. Object and Velocity and Direction Module 1103 may also use image motion, size and angle changes to estimate the velocity of objects, such as the velocity of hands and fingers Momentum and Inertia Module 1102 can use image motion, image size, and angle changes of objects in the image plane or in a three-dimensional space to estimate the velocity and direction of objects in the space or on a display. Momentum and Inertia Module 1102 is coupled to Object and Gesture Recognition System 1122 to estimate the velocity of gestures performed by hands, fingers, and other body parts and then to apply those estimates to determine momentum and velocities to virtual objects that are to be affected by the gesture.

3D Image Interaction and Effects Module 1105 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module 1105 in the foreground on one or more of the displays.

In a first example embodiment, an apparatus comprises a projector configured to project a sequence of light patterns on an object; a first camera configured to capture a sequence of images of the object illuminated with the projected light patterns; a second camera configured to capture a second image of the object illuminated with the projected light patterns and configured to capture a texture image of the object in the second image; a processing unit to receive the sequence of images and reconstruct depth using triangulation; and a calibration unit operable to perform a single view calibration process using a captured single view of a target having a known geometry with known radiometric properties and being at a single orientation and to generate calibration parameters to calibrate one or more of the projector and first and second cameras using the single view of the target.

In another example embodiment, the subject matter of the first example embodiment can optionally include that the single view calibration process comprises a rough calibration process, a depth refinement process and a texture camera calibration process.

In another example embodiment, the subject matter of the first example embodiment can optionally include that the calibration unit sets one or more calibration parameters based on alignment of a captured image to a corresponding synthesized image.

In another example embodiment, the subject matter of the first example embodiment can optionally include that the calibration unit updates intrinsic and extrinsic calibration parameters and a viewpoint based on closeness of a match between the captured image and the corresponding synthesized image.

In another example embodiment, the subject matter of the first example embodiment can optionally include that the target is planar and wherein the known geometry comprises a plurality of plane geometries having detectable features. In another example embodiment, the subject matter of the last example embodiment can optionally include that the plurality of plane geometries comprises an identical pattern.

In another example embodiment, the subject matter of the first example embodiment can optionally include that the projector comprises an infrared (IR) projector, the first camera comprises an IR camera, and the second camera comprises a red, green, and blue (RGB) camera.

In a second example embodiment, a method comprises capturing, using a camera, a single view of a target at a single orientation, the target having a known geometry with known radiometric properties; and performing a single view calibration process using the captured single view to generate calibration parameters to calibrate one or more devices in an active coded light triangulation system using the single view of the target.

In another example embodiment, the subject matter of the second example embodiment can optionally include that the single view calibration process comprises a rough calibration process, a depth refinement process and an RGB camera calibration process.

In another example embodiment, the subject matter of the second example embodiment can optionally include setting one or more calibration parameters based on alignment of a captured image to a corresponding synthesized image. In another example embodiment, the subject matter of the last example embodiment can optionally include updating intrinsic and extrinsic calibration parameters and a viewpoint based on closeness of a match between the captured image and the corresponding synthesized image.

In another example embodiment, the subject matter of the second example embodiment can optionally include capturing a first image of the target; capturing a second image of the target; generating synthesized images of the target; and setting one or more calibration parameters based on alignment of a captured image to its corresponding synthesized image. In another example embodiment, the subject matter of the last example embodiment can optionally include that generating synthesized images is performed using a first set of parameter settings of camera and projector intrinsic parameters, projector extrinsic parameters and viewpoint. In another example embodiment, the subject matter of the last example embodiment can optionally include that the viewpoint comprises the relative location and orientation of the system with respect to the target.

In another example embodiment, the subject matter of the second example embodiment can optionally include performing a depth refinement by reconstructing a depth image from captured image data using triangulation with a second set of parameter settings; matching the reconstructed depth image to a calculated depth image of the target; and setting one or more calibration parameters based on matching the reconstructed depth image to the calculated depth image. In another example embodiment, the subject matter of the last example embodiment can optionally include that matching is performed by minimizing a geometric error criterion.

In another example embodiment, the subject matter of the second example embodiment can optionally include performing texture camera calibration, including setting intrinsic and extrinsic parameters of the texture camera. In another example embodiment, the subject matter of the last example embodiment can optionally include that performing texture camera calibration occurs after generating intrinsic and extrinsic calibration parameters of an IR camera and IR projector among the devices and fixing a viewpoint of the system. In another example embodiment, the subject matter of the last example embodiment can optionally include performing texture camera calibration comprises: acquiring an image of the target captured by the texture camera with visible light illumination under a first set of camera parameters; matching the acquired image against a synthesized image of the target that would be seen by the texture camera under the first set of camera parameters; and updating one or more parameters of the first set of camera parameters results of matching the acquired image against the synthesized image.

In another example embodiment, the subject matter of the second example embodiment can optionally include that the target is planar and the known geometry comprises a plurality of plane geometries having detectable features. In another example embodiment, the subject matter of the last example embodiment can optionally include that the plurality of plane geometries comprises an identical pattern.

In another example embodiment, the subject matter of the second example embodiment can optionally include that the calibration parameters comprise intrinsic parameters that relate to one or more of lens parameters of one or more of the devices. In another example embodiment, the subject matter of the last example embodiment can optionally include that the calibration parameters comprise extrinsic parameters that relate to one or more of relative positioning and orientation with respect one or more of the devices. In another example embodiment, the subject matter of the last example embodiment can optionally include that the positioning and orientation are with respect to an infrared (IR) camera, the IR camera being one of the devices.

In a third example embodiment, an article of manufacture has one or more non-transitory computer readable storage media storing instructions which when executed by a system to perform a method comprising: capturing, using a camera, a single view of a target at a single orientation, the target having a known geometry with known radiometric properties; and performing a single view calibration process using the captured single view to generate calibration parameters to calibrate one or more devices in an active coded light triangulation system using the single view of the target.

In another example embodiment, the subject matter of the third example embodiment can optionally include that the single view calibration process comprises a rough calibration process, a depth refinement process and a texture camera calibration process.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a projector configured to project a sequence of light patterns on an object;
a first camera configured to capture a sequence of images of the object illuminated with the projected light patterns;
a second camera configured to capture a second image of the object illuminated with the projected light patterns and configured to capture a texture image of the object in the second image;
a calibration unit operable to perform a single view calibration process using a captured single view of a target having a known geometry with known radiometric properties and being at a single orientation and to generate one or more calibration parameters based on alignment of a captured image to a corresponding synthesized image to calibrate one or more of the projector and first and second cameras in an active coded light triangulation system using the single view of the target; and
a processing unit to receive the sequence of images and reconstruct depth using triangulation in response to the generated calibration parameters.

2. The apparatus defined in claim 1 wherein the single view calibration process comprises a rough calibration process, a depth refinement process and a texture camera calibration process.

3. The apparatus defined in claim 1 wherein the calibration unit updates intrinsic and extrinsic calibration parameters and a viewpoint based on closeness of a match between the captured image and the corresponding synthesized image.

4. The apparatus defined in claim 1 wherein the target is planar and wherein the known geometry comprises a plurality of plane geometries having detectable features.

5. The apparatus defined in claim 4 wherein the plurality of plane geometries comprises an identical pattern.

6. The apparatus defined in claim 1 wherein the projector comprises an infrared (IR) projector, the first camera comprises an IR camera, and the second camera comprises a red, green, and blue (RGB) camera.

7. A method comprising:
projecting, using a projector, a sequence of light patterns on an object;
capturing, using a first camera, a single view of a target at a single orientation, the target having a known geometry with known radiometric properties;
performing a single view calibration process using the captured single view to generate one or more calibration parameters based on alignment of a captured image to a corresponding synthesized image to calibrate one or more of the projector and first camera in an active coded light triangulation system using the single view of the target; and
receiving the sequence of images and reconstructing depth using triangulation in response to the generated calibration parameters.

8. The method defined in claim 7 wherein the single view calibration process comprises a rough calibration process, a depth refinement process and an RGB camera calibration process.

9. The method defined in claim 7 further comprising updating intrinsic and extrinsic calibration parameters and a viewpoint based on closeness of a match between the captured image and the corresponding synthesized image.

10. The method defined in claim 7 further comprising:
capturing a first image of the target; and
capturing a second image of the target;
generating synthesized images of the target; and
setting one or more calibration parameters based on alignment of a captured image to its corresponding synthesized image.

11. The method defined in claim 10 wherein generating synthesized images is performed using a first set of parameter settings of camera and projector intrinsic parameters, projector extrinsic parameters and viewpoint.

12. The method defined in claim 11 wherein the viewpoint comprises the relative location and orientation of the system with respect to the target.

13. The method defined in claim 7 further comprising performing a depth refinement by
reconstructing a depth image from captured image data using triangulation with a second set of parameter settings;
matching the reconstructed depth image to a calculated depth image of the target; and
setting one or more calibration parameters based on matching the reconstructed depth image to the calculated depth image.

14. The method defined in claim 13 wherein matching is performed by minimizing a geometric error criterion.

15. The method defined in claim 7 further comprising performing texture camera calibration for a texture camera in the active coded light triangulation system, including setting intrinsic and extrinsic parameters of the texture camera.

16. The method defined in claim 15 wherein the projector comprises an IR projector and the first camera comprises an IR camera, and further wherein performing texture camera calibration occurs after generating intrinsic and extrinsic calibration parameters of an IR camera and IR projector and fixing a viewpoint of the system.

17. The method defined in claim 15 wherein performing texture camera calibration comprises:
acquiring an image of the target captured by the texture camera with visible light illumination under a first set of camera parameters;
matching the acquired image against a synthesized image of the target that would be seen by the texture camera under the first set of camera parameters;
updating one or more parameters of the first set of camera parameters results of matching the acquired image against the synthesized image.

18. The method defined in claim 7 wherein the target is planar and the known geometry comprises a plurality of plane geometries having detectable features.

19. The method defined in claim 18 wherein the plurality of plane geometries comprises an identical pattern.

20. The method defined in claim 7 wherein the calibration parameters comprise intrinsic parameters that relate to one or more of lens parameters of one or more of the devices.

21. The method defined in claim 20 wherein the calibration parameters comprise extrinsic parameters that relate to one or more of relative positioning and orientation with respect one or more of the devices.

22. The method defined in claim 21 wherein the positioning and orientation are with respect to an infrared (IR) camera, the IR camera being one of the devices.

23. An article of manufacture having one or more non-transitory computer readable storage media storing instructions which when executed by a system to perform a method comprising:
   projecting, using a projector, a sequence of light patterns on an object;
   capturing, using a camera, a single view of a target at a single orientation, the target having a known geometry with known radiometric properties;
   performing a single view calibration process using the captured single view to generate one or more calibration parameters based on alignment of a captured image to a corresponding synthesized image to calibrate one or more of the projector and camera in an active coded light triangulation system using the single view of the target; and
   receiving the sequence of images and reconstructing depth using triangulation in response to the generated calibration parameters.

24. The article of manufacture defined in claim 23 wherein the single view calibration process comprises a rough calibration process, a depth refinement process and a texture camera calibration process.

\* \* \* \* \*